United States Patent
Ohnishi et al.

(10) Patent No.: US 7,539,576 B2
(45) Date of Patent: May 26, 2009

(54) PEDESTRIAN NAVIGATION DEVICE, PEDESTRIAN NAVIGATION SYSTEM, PEDESTRIAN NAVIGATION METHOD AND PROGRAM

(75) Inventors: Keisuke Ohnishi, Tokyo (JP); Takayuki Matsunaga, Tokyo (JP); Yusuke Suzuki, Tokyo (JP); Shin Kikuchi, Tokyo (JP)

(73) Assignee: Navitime Japan Co., Ltd., Tokyo (JP)

( * ) Notice: Subject to any disclaimer, the term of this patent is extended or adjusted under 35 U.S.C. 154(b) by 547 days.

(21) Appl. No.: 10/553,325

(22) PCT Filed: Apr. 15, 2004

(86) PCT No.: PCT/JP2004/005367

§ 371 (c)(1),
(2), (4) Date: Mar. 13, 2006

(87) PCT Pub. No.: WO2004/092679

PCT Pub. Date: Oct. 28, 2004

(65) Prior Publication Data

US 2006/0190168 A1  Aug. 24, 2006

(30) Foreign Application Priority Data

Apr. 17, 2003 (JP) ............................ 2003-112470
Oct. 16, 2003 (JP) ............................ 2003-355856

(51) Int. Cl.
*G01C 21/26* (2006.01)
*G11B 29/00* (2006.01)
*G06F 19/00* (2006.01)

(52) U.S. Cl. .................... 701/211; 701/201; 701/213; 340/944; 340/996

(58) Field of Classification Search ............... 701/211, 701/213, 207, 209, 201; 340/944, 995.14, 340/995.23, 996
See application file for complete search history.

(56) References Cited

U.S. PATENT DOCUMENTS

| 5,767,796 | A | 6/1998 | Van Roekel et al. |
| 6,614,352 | B2 * | 9/2003 | Pellet et al. ............... 340/573.1 |
| 6,671,618 | B2 * | 12/2003 | Hoisko ....................... 701/205 |
| 2002/0111737 | A1 | 8/2002 | Hoisko |
| 2003/0093216 | A1 * | 5/2003 | Akiyama ..................... 701/200 |
| 2004/0155815 | A1 | 8/2004 | Muncaster et al. |
| 2004/0204840 | A1 * | 10/2004 | Hashima et al. ............. 701/209 |

FOREIGN PATENT DOCUMENTS

| EP | 0 769 678 A1 | 4/1997 |
| EP | 1 220 179 A | 7/2002 |
| EP | 1 258 851 A2 | 11/2002 |

(Continued)

*Primary Examiner*—Tan Q Nguyen
(74) *Attorney, Agent, or Firm*—Nixon & Vanderhye P.C.

(57) ABSTRACT

A pedestrian navigation system provides distance information and travel directions to a destination. The system includes a pedestrian navigation device for navigating a pedestrian's route by means of a vibration, a server for offering navigation information to the pedestrian navigation device, a network for connecting the pedestrian navigation device with the server to permit communication between each other, and a GPS for offering position information to the pedestrian navigation device. Further, the pedestrian navigation device can include a speaker for outputting a guide voice based on the user's present position information, so as to start a voice guide after generating vibration, thereby facilitating verification of the guidance information provided.

12 Claims, 6 Drawing Sheets

FOREIGN PATENT DOCUMENTS

| | | |
|---|---|---|
| JP | 8-202982 | 8/1996 |
| JP | 11-160087 | 6/1999 |
| JP | 11-183183 | 7/1999 |
| JP | 2001-204062 | 7/2001 |
| JP | 2002-213981 | 7/2002 |
| JP | 2002-357444 | 12/2002 |
| JP | 2002-358007 | 12/2002 |
| JP | 2003-35555 | 2/2003 |
| JP | 2003-83762 | 3/2003 |
| WO | WO 02/093947 A | 11/2002 |

* cited by examiner

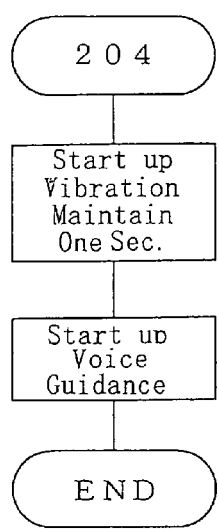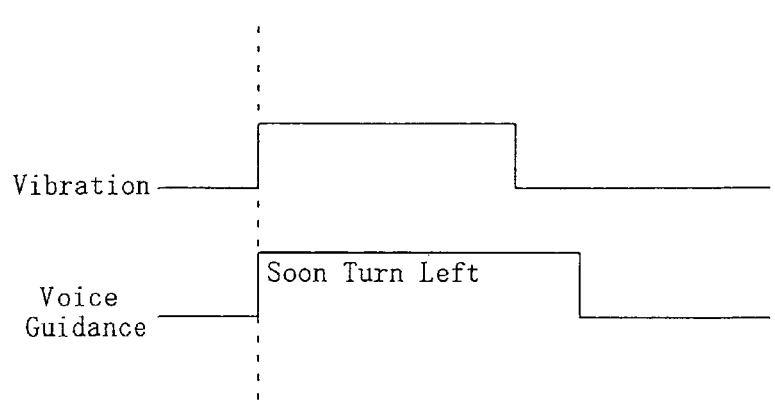
FIG. 3a
FIG. 3b
FIG. 3

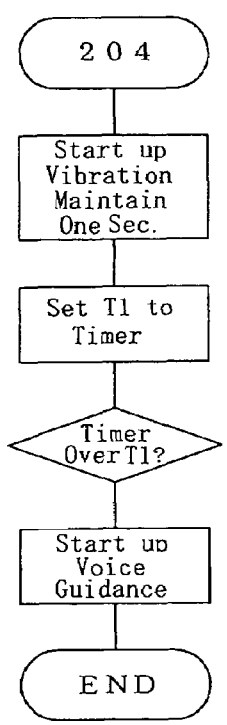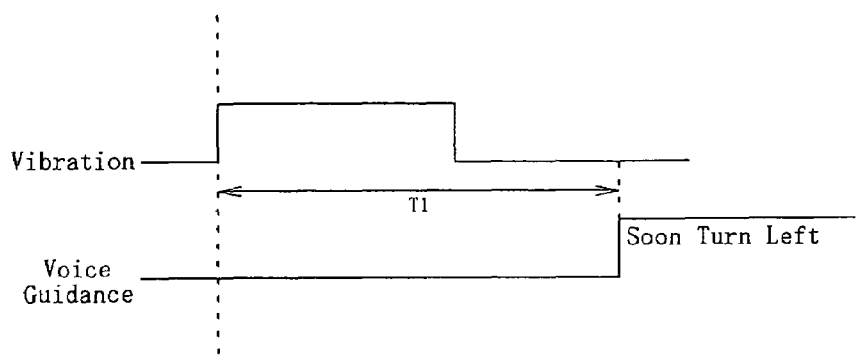
FIG.5a
FIG.5b
FIG.5

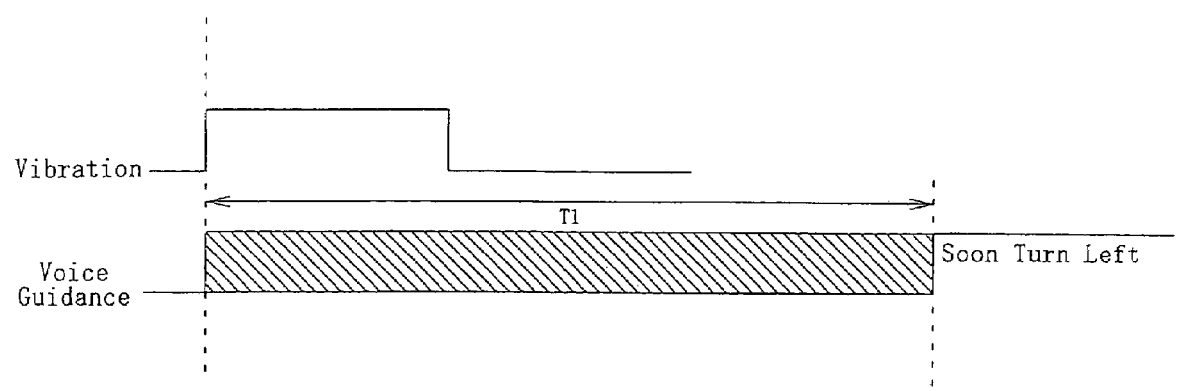
F I G . 6

PEDESTRIAN NAVIGATION DEVICE, PEDESTRIAN NAVIGATION SYSTEM, PEDESTRIAN NAVIGATION METHOD AND PROGRAM

This application is the US national phase of international application PCT/JP2004/005367, filed 15 Apr. 2004, which designated the U.S. and claims priority of JP 2003-112470, filed 17 Apr. 2003, and JP 2003-355856, filed 16 Oct. 2003, the entire contents of each of which are hereby incorporated by reference.

TECHNICAL FIELD

The present invention relates to a pedestrian navigation device, a pedestrian navigation system, a pedestrian navigation method, and a program that navigate a route for a pedestrian and more particularly, to a pedestrian navigation device, a pedestrian navigation system, a pedestrian navigation method, and a program which provides a pedestrian with a convenient means of obtaining information regarding distance and travel directions to a certain destination and the like by means of a vibration, or a voice guide started by means of a vibration, thereby facilitating verification of the guidance information provided.

BACKGROUND ART

Certain navigation devices and mobile phones conventionally exist which perform the function of navigating routes for automobiles and pedestrians based on position information obtainable from the Global Positioning System (GPS).

For example, Japanese Laid-Open Patent Publication No. 2002-357444 refers to a navigation system based on sound and the display of routing maps in a mobile terminal such as a mobile phone.

According to this navigation system, information regarding the user's present position and desired destination is transmitted from the mobile terminal to a server, and then map data including the present position and the desired destination is downloaded from the server and thereafter transmitted to and stored in the mobile terminal, which outputs the stored map data as sounds and images. The mobile terminal automatically emits a sound to notify the user of output by means of a speaker and displays the output in the form of images on the display screen of the mobile terminal.

In this case, it is not necessary for the mobile terminal to perform the function of updating map data, and it is possible to have the benefits of such navigation at low cost and with minimal power consumption.

However, according to the navigation system described in Japanese Laid-Open Patent Publication No. 2002-357444, the user must be in a traveling mode or otherwise move while viewing the map image shown on the display screen of the mobile terminal, making it unnecessarily inconvenient for the user.

Moreover if the guidance information provided is in the form of sounds, it may not be clearly received, considering the limitations to the volume and quality of sound produced by the speaker of the mobile terminal, and at times, sound guidance may not be easily recognized if the mobile terminal is carried by the user in his clothing pocket.

On the other hand, Japanese Laid-Open Patent Publication No. H11-160087 refers to a pedestrian navigation device which must be equipped with an IC card for storing map information and thus operates on a stand alone basis. In the navigation device of such invention, the user inputs a starting point and a desired destination, whereupon the device searches a route from the starting point to the destination, reads map information, and the searched route and the user's position are measured by present position measuring means and then displayed on a map, which includes certain indicators such as left and right turns by means of certain types of vibration patterns generated by vibration generating means.

However, the pedestrian navigation device described in the above-mentioned Japanese Laid-Open Patent Publication No. H11-160087 is rather inconvenient to use, because the user must provide for an IC card in advance for storing map information regarding certain areas of destination for which he requires or desires guidance, to enable him to utilize the navigation device at the desired destination.

Further, in the case of Japanese Laid-Open Patent Publication No. H11-183183, the navigation system intended for installation in an automobile comprises a navigation device which displays a map provided through map information generating means, simultaneously generating a sound signal from sound guide generating means to provide route guidance information, while detecting the generation of the sound signal to output a control signal, and a vibration device which is independent of the navigation device, where the navigation device vibrates according to the control signal output as a result of the detection of the sound signal generated. The driver of the automobile puts the vibration device in his clothing pocket or the like to alert him to the outputted sound guidance and map being displayed by the navigation device when the vibration device vibrates.

However, while the afore-mentioned navigation system which separately consists of the navigation device and the vibration device is suitable for a car navigation system, the same would not be convenient for a pedestrian to use because he will have to carry both devices and view the map being displayed on the screen while walking.

Another type of navigation system which has been introduced in Japanese Laid-Open Patent Publication No. 2001-204062 is configured in such manner that wireless communication base stations which respectively have a communication area and a center station are provided, whereby the center station retains map information, carries out route searching, and provides a portable terminal for communicating navigation information to a wireless base station. This navigation system is intended to eliminate the inconvenience posed by portable terminal retaining map data in a portable navigation system utilizing the GPS system.

According to the configuration of this navigation system, the portable terminal is provided with a vibration generating unit and/or a sound generating unit for receiving vibration data and/or sound guidance data in addition to map information and route guidance information from the center station, and provides guidance by means of vibration and/or sounds. As guidance means, the length and the number of vibrations generated vary according to the contents of the guidance information, such as a left turn or right turn, for example.

However, according to the navigation system described in Japanese Laid-Open Patent Publication No. 2001-204062, Dedicated Short Range Communications (DSRC) base stations are provided as wireless base stations, and the position of the portable terminal can be identified only within the area covered by the DSRC base station with which the portable terminal is communicating in particular, making the provision for precise route guidance difficult if not impossible. In addition, the navigation system suffers from the limitation that it cannot be combined with other navigation systems capable of carrying out unrestricted route searches.

Moreover, according to this navigation system, while the user is walking, the DSRC portable terminal successively transmits information on the user's position back to the center station, and the center station delivers route data to the user by causing the DSRC portable terminal to vibrate as a means of notification. As a method of route instruction, the DSRC portable terminal vibrates for such length of time and for such number of times to signify a turn to be made at a corner, going up or down the stairs, or in combination with a traffic signal, but the route instructions are provided only upon arrival at a certain location. Accordingly, guidance information cannot be provided in advance, for example, information on the distance required to be traversed (e.g., 70 m) before a guide point, such as an intersection.

In the case of a pedestrian navigation device constituted in a mobile phone with a GPS receiver, navigation information in the form of maps and route guidance information is accessed from an information delivery server. A user generally carries the mobile phone in his pocket or the like while walking, and takes out the mobile phone to view a display screen or to make or receive a phone call if necessary. The user carries out a similar operation to obtain navigation guidance information through the facility of the display screen of the mobile phone. This is not exactly convenient, because the user should preferably travel along a guided route, and walk while checking a map, a route, a present position, and the like shown on the display screen of his mobile phone at specified guide points or locations such as an intersection accompanying a left or right turn, or the neighborhood of the intended destination. In addition to the guiding method by which visual images are shown on the display screen, however, it would be preferable if the mobile phone is also capable of providing guidance even through non-visual means, and equipped with notifying means other than that normally employed for alerting the user that guidance information is about to be relayed or otherwise available visually.

DISCLOSURE OF THE INVENTION

As a result of various studies made by the inventors to address the above-mentioned problems, the present invention was formulated on the premise that if navigation guidance can be provided by means of vibration when the necessity arises, or if a user can be alerted that guidance is available by means of vibration, or that guidance will ensue upon the emission of a voice, thereby enabling the user to take out his mobile phone serving as a pedestrian navigation device from his pocket, and then view the display screen of the mobile phone upon hearing the voice, it will not be necessary for the user to travel while checking the map image shown on the display screen, even if the volume and quality of voice of the mobile phone is low.

Namely, the purpose of the present invention is to provide a pedestrian navigation device, a pedestrian navigation system, a pedestrian navigation method, and a program which navigates a pedestrian route, provides a convenient means of obtaining information regarding distance and travel directions to a certain destination, and the like by means of vibration, thereby facilitating verification of the information presented.

Moreover, another object of the present invention is to provide a pedestrian navigation device, a pedestrian navigation system, a pedestrian navigation method, and a program which navigates a pedestrian route, provides information regarding distance and travel directions to a certain destination, notifies the user of the availability of guidance by means of vibration, and provides a predetermined delay until delivery of the information by means of a voice guide to give the user sufficient time to prepare the display screen of the navigation device constituted in a mobile phone for viewing in a comfortable position, and facilitate listening to the voice guidance, enhancing convenience of use and verification of the information presented.

The above-mentioned objects of the present invention can be realized by the following configurations. Namely, a pedestrian navigation device according to a first mode of the present invention is a pedestrian navigation device constituted in a mobile phone for navigating a pedestrian route, comprising in particular:

position information receiving means that acquires position information from the GPS system;

position information analyzing means that analyzes the position information received by the position information receiving means to calculate a present position;

map information storing means that stores map information received from a server that provides navigation information;

central processing means that calculates present position information based on the present position calculated by the position information analyzing means and the map information stored in the map information storing means; and vibrating means that generates a vibration guide based on the present position information calculated by the central processing means.

Moreover, the pedestrian navigation device according to the first mode of the invention comprises:

position information receiving means that acquires position information from the GPS system;

position information analyzing means that analyzes the position information received by the position information receiving means to calculate a present position;

map information storing means that stores map information received from a server that provides navigation information;

central processing means that calculates present position information based on the present position calculated by the position information analyzing means and the map information stored in the map information storing means;

vibrating means that generates a vibration guide based on the present position information calculated by the central processing means; and vibration pattern storing means that stores vibration patterns of the vibration guide generated by the vibrating means, characterized in that:

the central processing means determines a vibration pattern corresponding to the present position information derived from among the vibration patterns stored in the vibration pattern storing means; and the vibrating means generates the vibration guide based on the vibration pattern determined by the central processing means.

In addition, the pedestrian navigation device according to the first mode of the invention is characterized in that the vibration pattern refers to the period of vibration of the vibration guide generated by the vibrating means.

Further, the pedestrian navigation device according to the first mode of the invention is characterized in that the vibration pattern refers to the intensity of the vibration guide generated by the vibrating means.

Further, the pedestrian navigation device according to the first mode of the invention is characterized in that the vibration pattern comprises a combination of patterns represented by the period of vibration and intensity of the vibration guide generated by the vibrating means.

Moreover, the pedestrian navigation system according to the first mode of the present invention comprises:

a pedestrian navigation device constituted in a mobile phone for navigating a pedestrian route;

a server that provides the pedestrian navigation device with navigation information; and a network that permits the pedestrian navigation device and the server to communicate with each other.

In addition, the pedestrian navigation system according to this mode of the invention comprises:

a pedestrian navigation device constituted in a mobile phone for navigating a pedestrian route;

a server that provides the pedestrian navigation device with navigation information; and a network that permits the pedestrian navigation device and the server to communicate with each other, characterized in that:

the pedestrian navigation device downloads the vibration pattern from the server.

Further, the pedestrian navigation system according to this mode of the invention is characterized in that the network referred to is the Internet or an intranet.

A pedestrian navigation method according to the first mode of the present invention is a pedestrian navigation method for navigating a pedestrian route, characterized by the following steps:

(A) position information is acquired from the GPS system;

(B) the acquired position information is analyzed to calculate the user's present position;

(C) present position information is calculated based on the calculated present position of the user and map information received from a server that provides navigation information; and (D) vibration is generated based on the calculated present position information.

Further, the pedestrian navigation method according to this mode of the invention is characterized in that in step (D), the vibration pattern corresponding to the present position information is derived from among vibration patterns arranged in advance, and the vibration guide is generated based on the vibration pattern.

Further, the pedestrian navigation method according to this mode of the invention is characterized in that, in step (D), the vibration pattern refers to the period of vibration of the vibration guide generated.

Further, the pedestrian navigation method according to this mode of the invention is characterized in that in step (D), the vibration pattern refers to the intensity of the vibration guide generated.

Further, the pedestrian navigation method according to this mode of the invention is characterized in that in step (D), the vibration pattern comprises a combination of patterns represented by the period of vibration and intensity of the vibration guide generated.

The program according to the first mode of the present invention is such that it induces a mobile phone to navigate a pedestrian route, characterized in that the mobile phone performs the function of the pedestrian navigation device.

Further, the program according to the first mode of the present invention is such that it induces a mobile phone to navigate a pedestrian route, characterized in that the mobile phone performs the function of processing carried out by means of the pedestrian navigation method.

According to the configurations of the first mode of the invention, it is possible to provide a pedestrian navigation device, a pedestrian navigation system, a pedestrian navigation method, and a program by which information on distance and travel directions to a certain destination and the like is conveniently obtained by means of vibration, thereby facilitating verification of the information presented.

Namely, according to the pedestrian navigation device and the pedestrian navigation system of the present invention, it is possible to provide information on distance and travel directions to a certain destination and the like by means of vibration, thereby eliminating the need for the user to walk while viewing and verifying the image display, thereby enhancing convenience of navigation.

In this manner, it will not be necessary to constantly check the image display while walking or traveling, thereby facilitating verification of the information received. Moreover, it will not be necessary to walk or travel with the speaker of the mobile phone constantly turned on, which raises the issue of concern for one's surroundings because of the detrimental effect that sound emission makes to the environment.

Further, the pedestrian navigation device according to the second mode of the present invention is constituted in a mobile phone for navigating a pedestrian route, comprising in particular:

position information receiving means that acquires position information from the GPS system;

position information analyzing means that analyzes the position information received by the position information receiving means to calculate a present position;

map information storing means that stores map information received from a server that provides navigation information;

central processing means that calculates present position information based on the present position calculated by the position information analyzing means and the map information stored in the map information storing means;

vibrating means that generates a vibration guide based on the present position information calculated by the central processing means; and voice guide output means that outputs a guide voice based on the present position information calculated by the central processing means.

Moreover, the pedestrian navigation device according to the second mode of the invention comprises:

position information receiving means that acquires position information from the GPS system;

position information analyzing means that analyzes the position information received by the position information receiving means to calculate a present position;

map information storing means that stores map information received from a server that provides navigation information;

central processing means that calculates present position information based on the present position calculated by the position information analyzing means and the map information stored in the map information storing means;

vibrating means that generates a vibration guide based on the present position information calculated by the central processing means; and voice guide output means that outputs a guide voice based on the present position information calculated by the central processing means, characterized in that:

the voice guide output means outputs the guide voice after a predetermined delay from the time the vibration guide is generated.

In addition, the pedestrian navigation device according to the above mode is characterized in that the voice guide output means adds either a soundless (voiceless) section, a sound effect, or a melody for a predetermined period of time at the onset of the sound voice.

Moreover, the pedestrian navigation system according to the second mode of the present invention comprises:

a pedestrian navigation device constituted in a mobile phone for navigating a pedestrian route;

a server that provides the pedestrian navigation device with navigation information; and a network that permits the pedestrian navigation device and the server to communicate with each other.

In addition, the pedestrian navigation system according to this mode of the invention comprises:

a pedestrian navigation device constituted in a mobile phone for navigating a pedestrian route;

a server that provides the pedestrian navigation device with navigation information; and a network that permits the pedestrian navigation device and the server to communicate with each other, characterized in that:

the pedestrian navigation device downloads a voice pattern corresponding to the guide voice from the server.

Further, the pedestrian navigation system according to this mode of the invention is characterized in that the network referred to is the Internet or an intranet.

The pedestrian navigation method according to the second mode of the present invention is a pedestrian navigation method for navigating a pedestrian route, characterized by the following steps:

(A) position information is acquired from the GPS system;

(B) the acquired position information is analyzed to calculate the user's present position;

(C) present position information is calculated based on the calculated present position of the user and map information received from a server that provides navigation information;

(D) vibration is generated based on the calculated present position information; and (E) a guide voice is outputted based on the calculated present position information.

Moreover, the pedestrian navigation method according to the second mode of the present invention is a pedestrian navigation method for navigating a pedestrian route, characterized by the following steps:

(A) position information is acquired from the GPS system;

(B) the acquired position information is analyzed to calculate the user's present position;

(C) present position information is calculated based on the calculated present position of the user and map information received from a server that provides navigation information;

(D) vibration is generated based on the calculated present position information; and (E) a guide voice is outputted based on the calculated present position information after a predetermined delay from the generation of the vibration.

In addition, the pedestrian navigation method according to the second mode of the invention is characterized in that delaying means is provided to start the voice guide after a predetermined delay from the time the vibration guide is generated.

Further, the pedestrian navigation method according to this mode is characterized in that the sound guide includes a soundless (voiceless) section, a sound effect, or a melody for a predetermined period added at inception of the guide voice.

The program according to the second mode of the present invention is a program that induces a mobile phone as the pedestrian navigation device to navigate a pedestrian route.

In addition, the program according to the second mode of the present invention is a program that induces a mobile phone to navigate a pedestrian route, characterized in that the mobile phone performs the function of processing carried out by the pedestrian navigation method.

According to the configurations of the second mode of the invention, since the pedestrian navigation device constituted in a mobile phone utilizes a vibration unit provided therein to first notify the user of the availability of guidance information by means of vibration even before the user arrives at a certain guide point marked and used for route guidance, and, simultaneously or after a predetermined period, generates the release of voice guidance information, the user is thus given sufficient time to take out the mobile phone from his pocket or the like when the device vibrates to check the map image to be displayed. Moreover, if the user moves to an area where the mobile phone's display quality is enhanced as to facilitate viewing of the map image on display, the voice guidance becomes more audible, and it is thus possible to rely on voice guidance even if the volume of voice of the mobile phone is low.

In other words, since distance information and travel directions to a desired destination can be provided in the form of a voice guide while the incidence of vibration signifies as a cue that such guidance information is available, the user is therefore able to pay attention to the voice guide without haste, thereby making it convenient for him to facilitate verification of the information.

Moreover, it will not be necessary for the user to walk or travel while the speaker is constantly turned on, thereby eliminating the need to be concerned with the possible detrimental effect of voice emission to the environment. In addition, it will not be necessary to constantly view the image display while walking or traveling, thereby enhancing convenience of verifying the information received.

Further, since the pedestrian navigation device constituted in the mobile phone according to the first and second modes of the present invention acquires position information from the GPS, causes the server to search for a route, and receives the delivery of guide data along with map and route information, it can perform the function of route guidance accurately, while at the same time, make unrestricted route searching possible. Further, the pedestrian navigation device is capable of providing guidance information in advance, for example, information on the distance required to be traversed (e.g., 70 m) before a guide point, such as an intersection.

BRIEF DESCRIPTION OF THE DRAWINGS

FIG. 3 is a drawing showing the steps involved in the production of a voice guide, in which flowchart FIG. 3a illustrates the generation of a voice guide and drawing FIG. 3b is the corresponding timing chart thereof.

FIG. 5 is a drawing showing the steps involved in the production of the voice guide referred to in the pedestrian navigation device represented in FIG. 4, in which flowchart FIG. 5a illustrates the generation of a voice guide and drawing FIG. 5b is the corresponding timing chart thereof.

FIG. 6 is a timing chart showing another example of the process of generation of a voice guide.

BEST MODE FOR CARRYING OUT THE INVENTION

Description will now be made to illustrate the embodiments of a pedestrian navigation device, a pedestrian navigation system, a pedestrian navigation method, and a program according to the present invention with reference to the drawings.

Figure 1:
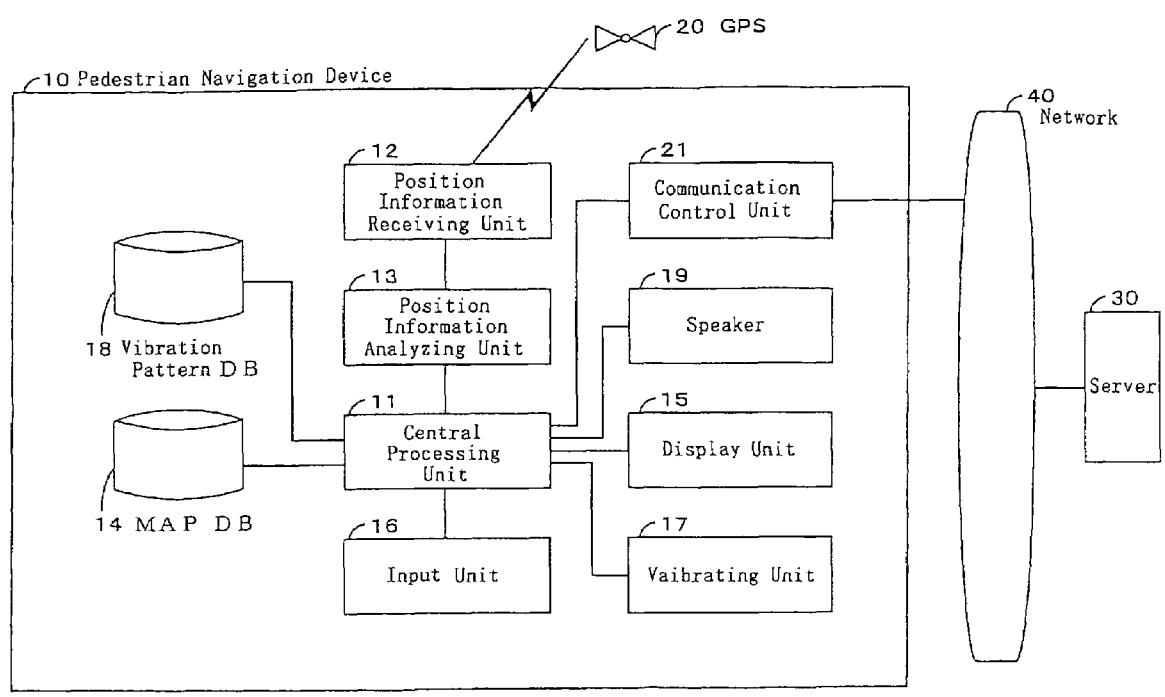
FIG. 1 is a block diagram showing an example of a pedestrian navigation system including a pedestrian navigation device according to the present invention.

FIG. 1 is a block diagram showing an example of the pedestrian navigation system including the pedestrian navigation device according to the first mode of the present invention. In FIG. 1, the pedestrian navigation system is provided with a pedestrian navigation device 10 constituted in a mobile phone for navigating a pedestrian route by means of vibration, a server 30 that provides the pedestrian navigation device 10 with navigation information, a network 40 that permits the pedestrian navigation device 10 and the server 30 to communicate with each other, and the GPS (Global Positioning System) 20 that provides the pedestrian navigation device 10 with position information.

In this configuration, the network 40 may consist of the Internet or an intranet. Moreover, the pedestrian navigation device 10 is capable of downloading vibration patterns and map information from the server.

In addition, in FIG. 1, the pedestrian navigation device 10 is provided with a communication control unit 21 that is connected to the network 40 to receive from and transmit information to the server 30, a position information receiving unit 12 that acquires position information from the GPS 20, a position information analyzing unit 13 that analyzes the position information received by the position information receiving unit 12 to calculate a present position, a MAP DB (MAP Data Base) 14 that stores map information, a central processing unit 11 that calculates present position information based on the present position calculated by the position information analyzing unit 13 and the map information stored in the MAP DB 14, a vibrating unit 17 that generates a vibration guide based on the present position information calculated by the central processing unit 11, a vibration pattern DB 18 that stores vibration patterns of the vibration guides generated by the vibrating unit 17, a speaker 19 that outputs a voice guide based on the present position information calculated by the central processing unit 11, a display unit 15 that displays the present position information calculated by the central processing unit 11, and an input unit 16 that is used to input route search conditions and to command commencement of navigation.

In this configuration, the central processing unit 11 determines the vibration pattern and the voice guide corresponding to the present position information from among the vibration patterns stored in the vibration pattern DB 18. The vibrating unit 17 generates the vibration guide based on the vibration pattern determined by the central processing unit 11, and the speaker 19 outputs the voice guide determined by the central processing unit 11.

Moreover, the vibration pattern DB 18 is also capable of storing vibration patterns pertaining to the varying periods of vibration and degrees of intensity of the vibration guides generated by the vibrating unit 17, as well as patterns comprising a combination of both kinds of patterns and the like.

The processing function carried out in accordance with the pedestrian navigation method subject of the present invention includes the following steps.

In Step (A), position information is accessed from the GPS 20, followed by Step (B) in which the acquired position information is analyzed to calculate the user's present position. Next, in Step (C), the present position information is analyzed based on the calculated present position, and the map information, followed by Step (D), in which vibration is generated based on the calculated present position information, and thereafter in Step (E), the voice guide is outputted based on the calculated present position information.

In the abovementioned process, the vibration pattern corresponding to the present position information from among the vibration patterns arranged in advance is determined in Step (D), while the vibration guide is generated based on the vibration pattern, while the voice guide corresponding to the present position information is determined and outputted in Step (E). Moreover, in the step (D), the vibration pattern may consist of a pattern pertaining to the period or the intensity of the vibration or a combination of both patterns generated.

Description will now be made of an example of the pedestrian navigation method according to the present invention with reference to FIGS. 1 and 2. Navigation commences upon the inputting of a starting point, (which may either be the user's present position or an arbitrary location) and a destination into the input unit 16. The server 30 or the central processing unit 11 of the pedestrian navigation device 10 then searches and detects route information and determines a navigation route. In this connection, any of the existing known methods may be employed for determining the navigation route.

The position information receiving unit 12 of the pedestrian navigation device 10 receives position information from the GPS 20, which the position information analyzing unit 13 analyzes in order to calculate the user's present position. The central processing unit 11 calculates the present position information based on the user's present position calculated by the position information analyzing unit 13 as well as the map information stored in the MAP DB 14. The central processing unit 11 thereafter compares the calculated present position information and the navigation route with each other to determine whether the user's present position exists in the proposed route (step 201).

If it is determined that the user's present position is not present in the proposed route in step 201, the central processing unit 11 selects a vibration pattern for an off-route from the vibration pattern DB 18, and generates vibration corresponding to the vibration pattern from the vibrating unit 17 to declare the off-route (step 202).

On the other hand, if it is determined that the user's present position exists in the proposed route in step 201, the central processing unit 11 selects a vibration pattern corresponding to the next guide point (such as an intersection, a bus stop, a railroad station, or a certain destination) from the vibration pattern DB 18, and generates vibration corresponding to respective vibration patterns from the vibrating unit 17 to declare the range of distance to the next guide point (such as distance information) (step 203, and step 204-1 to step 204-$n$).

Figure 2:
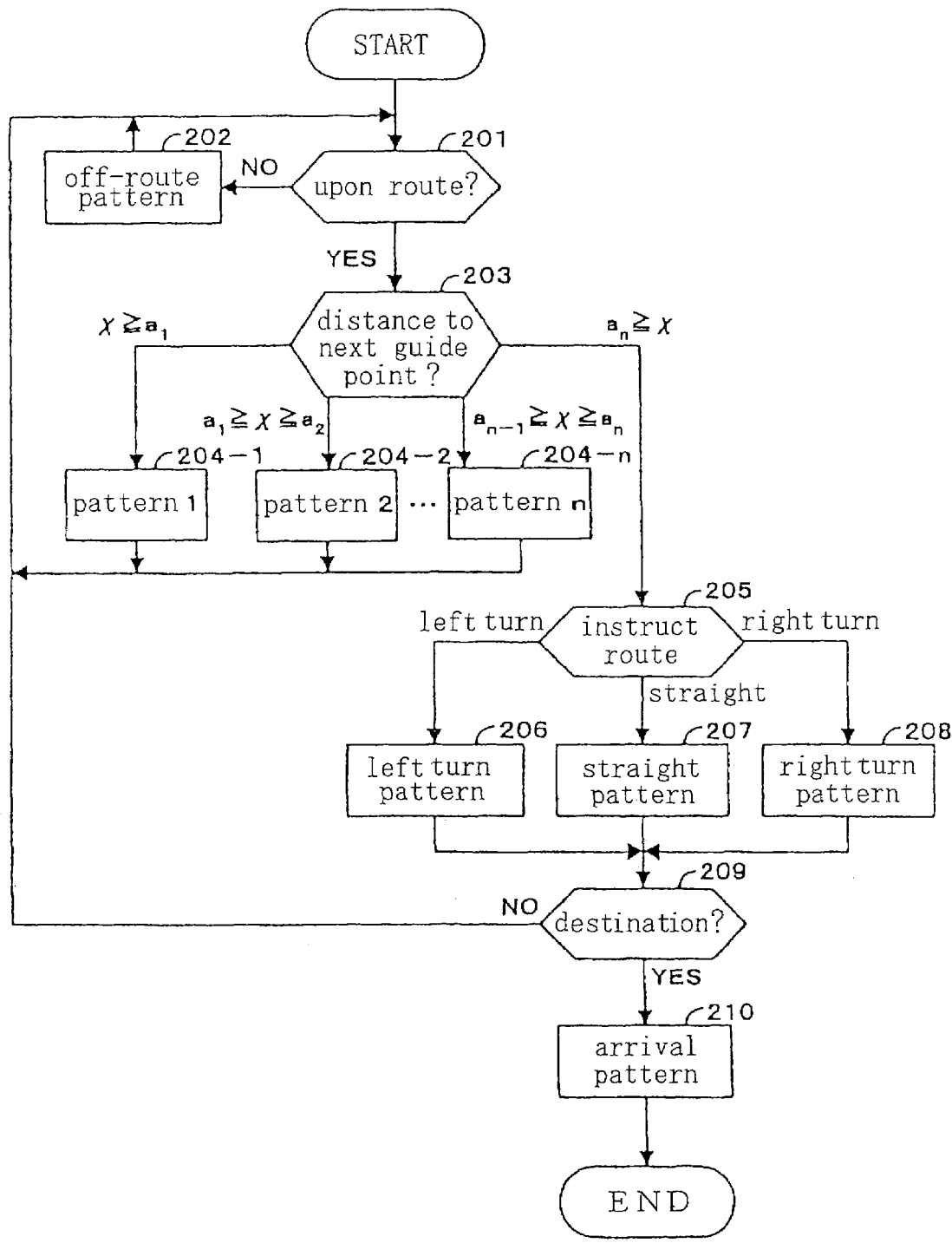
FIG. 2 is a flowchart showing the processing function carried out in accordance with the pedestrian navigation method subject of the present invention.

In FIG. 2, the vibration pattern (pattern I (I=1 to n)) is determined by analyzing the range of distance x from the user's present position to the next guide point from among predetermined distance ranges $a_I$ (I=1 to n). For example, (1) a vibration pattern is designated vibration pattern 1 (vibration period (vibration interval): long, vibration intensity: weak) if $x \geq a_1$ (300 [m]); or (2) a vibration pattern is designated vibration pattern 2 (vibration period (vibration interval): medium, vibration intensity: medium) if $a_1$ (300 [m]) $\geq x \geq a_2$ (200 [m]); and (3) a vibration pattern is designated vibration pattern 3 (vibration period (vibration interval): short, vibration intensity: strong) if $a_2$ (200 [m]) $\geq x \geq a_3$ (100 [m]).

Moreover, if the distance x from the user's present position to the next guide point falls within a predetermined distance range $a_n$ (100 [m]$\geq$x, for example), a vibration pattern (a left turn pattern, a straight travel pattern, or a right turn pattern) for indicating a travel direction left turn, straight travel, or right turn) at the next guide point is selected, and the vibrating unit 17 vibrates according to the respective vibration patterns (step 205 to step 208). In this regard, vibration patterns at a certain guide point corresponding to instructions for making a "U-turn" or going forward diagonally to the left or right or backward diagonally to the left or right in addition to the standard "turn left", "go straight" and "turn right" directions may be arranged in the vibration pattern DB 18 for use as may be required.

In addition, it should be noted that such vibration patterns may be downloaded from the server 30 and stored in the vibration pattern DB 18, while the required vibration patterns may be selectively downloaded.

Further, a voice guide such as voice guidance or a predetermined instruction voice may be outputted from the speaker 19 when the respective vibration patterns are generated at time points corresponding to the guide points (step 204-1 to step 204-*n* and step 206 to step 208).

When the voice guide such as voice guidance or the predetermined instruction voice is outputted when the respective vibration patterns are generated in step 204, the user may find the voice guidance inaudible even if he recognizes the vibration pattern and pays attention thereto. For instance, if there is ambient noise in the vicinity of the user's present position, he may not be able to hear the voice guidance from inception even if he brings the portable terminal or the like close to the ear. Accordingly, depending on the internal specification of the mobile phone, the startup of the vibration may be configured as a function call to allow instantaneous processing, such that the mobile phone may vibrate and signal the start of the voice guidance almost at the same time even if the vibration period is set to one second as shown in the flowchart in FIG. 3(*a*) and the timing chart in FIG. 3(*b*). This problem normally ensues in the case of the conventional mobile phone where vibration was merely intended to serve the function of a ring tone, and not for the purpose of operating in combination with another function.

Figure 4:
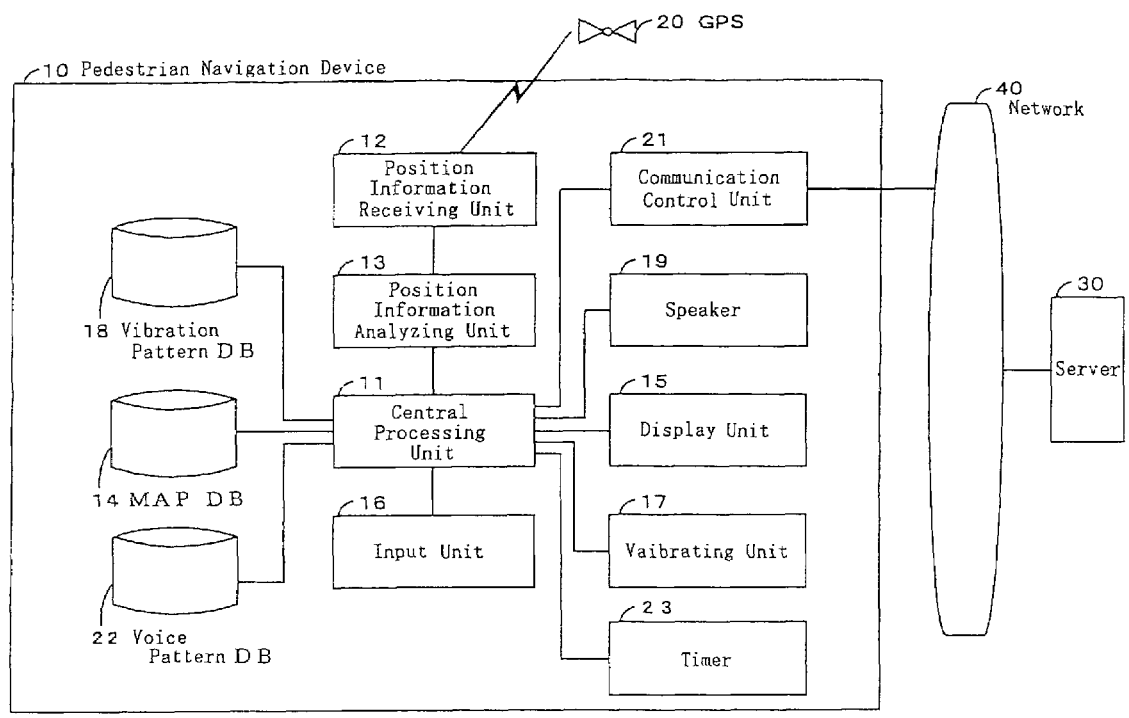
FIG. 4 is a block diagram showing another example of the pedestrian navigation system including the pedestrian navigation device according to the present invention.

FIG. 4 is a block diagram showing another example of the pedestrian navigation system according to the second mode of the present invention intended to solve this problem. As exemplified in FIG. 4, in the pedestrian navigation system including the pedestrian navigation device according to the present invention, the pedestrian navigation device is provided with a sound pattern database and a timer, whereby provision is made to substantially delay the delivery of voice guidance information after the vibration occurs.

The pedestrian navigation device 10 referred to in FIG. 4, that navigates a pedestrian route by means of vibration is provided with the communication control unit 21 that is connected to the network 40 to receive from and transmit information to the server 30, the position information receiving unit 12 that acquires the position information from the GPS 20, the position information analyzing unit 13 that analyzes the position information received by the position information receiving unit 12 to calculate the present position, the MAP DB 14 that stores the map information, the central processing unit 11 that calculates the present position information based on the present position calculated by the position information analyzing unit 13 and the map information stored in the MAP DB 14, the vibrating unit 17 that generates the vibration guide based on the present position information calculated by the central processing unit 11, the vibration pattern DB 18 that stores the vibration patterns of the vibration guides generated by the vibrating unit 17, the speaker 19 that outputs the voice guide based on the present position information calculated by the central processing unit 11, the display unit 15 that displays the present position information calculated by the central processing unit 11, and the input unit 16 that is used to input the route search conditions and to command commencement of navigation, as well as the voice pattern data base (voice pattern DB) 22 that stores contents of the voice guidance and the timer 23.

As shown in FIGS. 1 and 2, navigation starts when input is made to the input unit 16, followed by detection of route information to determine a navigation route, the acquisition of position information from the GPS 20 by the position information receiving unit 12, calculation of the present position by means of position information analysis in the position information analyzing unit 13, calculation of the present position information by the central processing unit 11, comparing the calculated present position information and the navigation route with each other, and determining whether the present position exists in the proposed route. As a result of the comparison and determination made, vibration is generated, notice of the delivery of voice guidance ensues, and, in this regard, the central processing unit 11 determines the vibration pattern corresponding to the present position information from among the vibration patterns stored in the vibration pattern DB 18.

The vibrating unit 17 generates the vibration guide based on the vibration pattern determined by the central processing unit 11. Similarly, the central processing unit 11 determines the corresponding sound pattern and sound guidance corresponding to the present position information from among the sound patterns stored in the sound pattern DB 22. After the vibrating unit generates the vibration guide, the speaker 19 outputs the voice guidance based on the voice pattern determined by the central processing unit 11. In this case, sound patterns corresponding to the voice guide may be downloaded from the server 30 and stored in the voice pattern DB 22, while the required sound patterns may be selectively downloaded.

It should be noted that only simple vibration patterns need be arranged in the vibration pattern DB to serve only as a cue that voice guidance is available. In this manner, it will not be necessary for the user to memorize the nature and content of such vibration patterns and he can therefore devote more attention to the voice guidance and the displayed map.

On this occasion, as shown in FIG. 5, provision for delay T1 by the timer 23 starting from the moment the vibrating unit 17 generates the vibration pattern, such that the sound guidance may ensue when delay T1 has elapsed. FIG. 5 shows the steps involved in the production of the voice guide in the pedestrian navigation device represented in FIG. 4, in which flowchart (a) illustrates the generation of a voice guide and drawing (b) is the corresponding timing chart thereof. For example, it has been confirmed by experiment that if the period of the vibration guide is set to one second, the voice guidance should preferably be set to start after two seconds have elapsed, such that the delay to be set by the timer 23 should be three seconds. Alternatively, the length of delay may be variably set by the user. If the length of delay is variable, it would be possible for the user to adjust the delay setting to match his own preferences, considering such factors as the location of the user's clothing pocket or the user's degree of familiarity in operating the pedestrian navigation device.

Further, as shown in the timing chart of FIG. 6, any one of a soundless section, a sound effect or a melody, or the like for an appropriate period, e.g., three seconds, may be added at the inception of the voice guidance. Since the compression ratio of soundless section data is high, capacity thereof is rather small, such that it hardly exerts any influence if downloaded to the portable terminal. In this case, it is possible to induce the start of the voice guide after a predetermined delay from the end of the sequence of the vibration pattern without the need to provide for delaying means such as a timer. It is thus possible to apply this configuration to products which have already been sold without the need to change the program but by simply changing the sound data.

The navigation process indicated in steps 201 to 208 is repeated up to the destination (step 209), and navigation ends after vibration is generated by an arrival pattern at the destination or in the vicinity of the destination (step 210). In this case, it is possible to output the voice guide such as the voice guidance.

While description of the pedestrian navigation devices and the pedestrian navigation methods according to the present invention has been made above, it is possible to apply the program subject of the same invention for navigating a pedestrian route to a portable terminal constituted by a mobile phone, as the program can induce the mobile phone to perform the functions of the afore-described pedestrian navigation devices and carry out processing in accordance with the afore-mentioned pedestrian navigation methods.

What is claimed is:

1. A pedestrian navigation device constituted in a mobile phone for navigating a pedestrian route, comprising:
    position information receiving means that acquires position information from a GPS system;
    position information analyzing means that analyzes the position information received by the position information receiving means to calculate a present position;
    map information storing means that stores map information received from a server that provides navigation information;
    central processing means that calculates present position information based on the present position calculated by the position information analyzing means and the map information stored in the map information storing means;
    vibrating means that generates a vibration guide based on the present position information calculated by the central processing means; and
    voice guide output means that outputs a guide voice based on the present position information calculated by the central processing means, wherein:
    the voice guide output means outputs the guide voice after a predetermined delay from the time the vibration guide is generated.

2. The pedestrian navigation device according to claim 1, wherein the voice guide output means adds either a soundless (voiceless) section, a sound effect, or a melody for a predetermined period at the onset of the guide voice.

3. A pedestrian navigation system comprising:
    a pedestrian navigation device that is constituted in a mobile phone for navigating a pedestrian route;
    a server that provides the pedestrian navigation device with navigation information; and
    a network that permits the pedestrian navigation device and the server to communicate with each other, wherein:
    the pedestrian navigation device is the pedestrian navigation device according to claim 1.

4. The pedestrian navigation system according to claim 3, wherein the network is the Internet or an intranet.

5. A pedestrian navigation system comprising:
    a pedestrian navigation device that is constituted in a mobile phone for navigating a pedestrian route;
    a server that provides the pedestrian navigation device with navigation information; and
    a network that permits the pedestrian navigation device and the server to communicate with each other, wherein:
    the pedestrian navigation device is the pedestrian navigation device according to claim 1, and downloads a voice pattern of the guide voice from the server.

6. A program stored on a computer-readable medium and executable by a computer processor that induces a mobile phone to navigate a pedestrian route, wherein the mobile phone performs the function of the pedestrian navigation device according to claim 1.

7. The pedestrian navigation device according to claim 1, wherein the predetermined delay is selectable by a user.

8. A pedestrian navigation method for navigating a pedestrian route, comprising the following steps:
    (A) position information is acquired from a GPS system;
    (B) the acquired position information is analyzed to calculate a user's present position;
    (C) present position information is calculated based on the calculated present position of the user and map information received from a server that provides navigation information;
    (D) vibration is generated based on the calculated present position information; and
    (E) a guide voice is outputted based on the calculated present position information after a predetermined delay from the time the vibration is generated.

9. The pedestrian navigation method according to claim 8, wherein delaying means is provided to start the voice guide after the predetermined delay from the time the vibration guide is generated.

10. The pedestrian navigation method according to claim 8, wherein either a soundless (voiceless) section, a sound effect, or a melody for a predetermined period is added at the onset of the guide voice.

11. A program stored on a computer-readable medium and executable by a computer processor that induces a mobile phone to navigate a pedestrian route, wherein the mobile phone performs the function of processing carried out by means of the pedestrian navigation method according to claim 8.

12. The pedestrian navigation device according to claim 8, wherein the predetermined delay is selectable by a user.

* * * * *